United States Patent [19]

Stuart

[11] Patent Number: 4,693,651
[45] Date of Patent: Sep. 15, 1987

[54] TRAILER WITH SPECIAL RAMPS

[75] Inventor: Gerald W. Stuart, Pontiac, Mich.

[73] Assignee: Traffic Transport Engineering, Inc., Romulus, Mich.

[21] Appl. No.: 902,634

[22] Filed: Sep. 2, 1986

[51] Int. Cl.$^4$ ................................................ B60P 1/00
[52] U.S. Cl. ...................................... 410/30; 188/32; 410/19; 410/67
[58] Field of Search ...................... 410/7, 8, 13, 19, 24, 410/25, 49, 30, 3, 4, 9, 65, 66, 67; 188/32, 111

[56] References Cited

U.S. PATENT DOCUMENTS

| | | | |
|---|---|---|---|
| 1,566,427 | 12/1925 | Reneau | 269/47 |
| 1,778,162 | 10/1930 | Mills et al. | 410/22 |
| 2,480,121 | 8/1949 | Cupp | 410/30 |
| 2,858,905 | 11/1958 | Fahland | 410/30 |
| 3,709,155 | 1/1973 | Pringle | 410/7 |
| 4,024,820 | 5/1977 | Hlinsky et al. | 410/30 |
| 4,307,985 | 12/1981 | Desprez et al. | 410/46 |
| 4,455,119 | 6/1984 | Smith | 414/537 |

Primary Examiner—Randolph A. Reese
Assistant Examiner—Carol L. Olson
Attorney, Agent, or Firm—Barnes, Kisselle, Raisch, Choate, Whittemore & Hulbert

[57] ABSTRACT

A transport, such as a trailer, for hauling vehicles has ramps for supporting the wheels of the vehicles. Each ramp has a plurality of longitudinally spaced transverse pins which are sufficiently close together to provide a track over which the wheels of the vehicles may travel during loading and unloading. The pins are removable so that selected pins may be removed to provide pockets to receive the wheels for transit.

7 Claims, 5 Drawing Figures

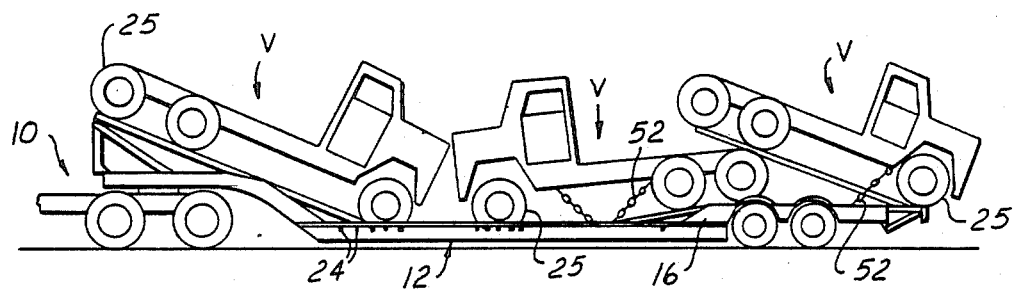
FIG. 1
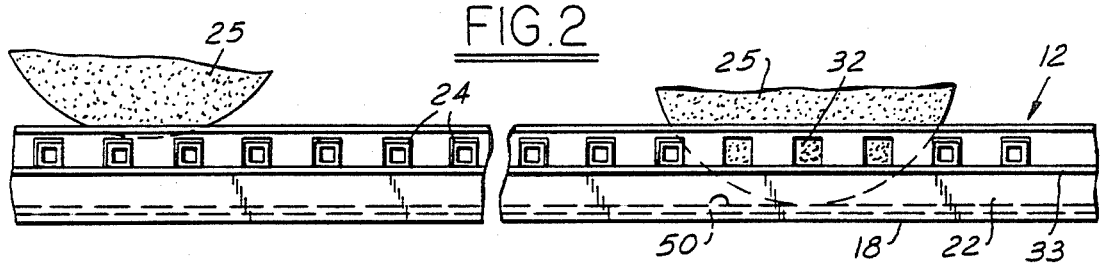
FIG. 2
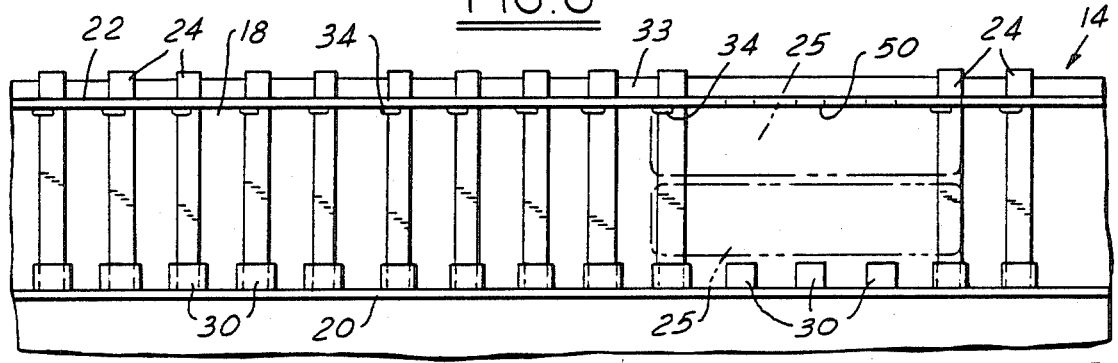
FIG. 3
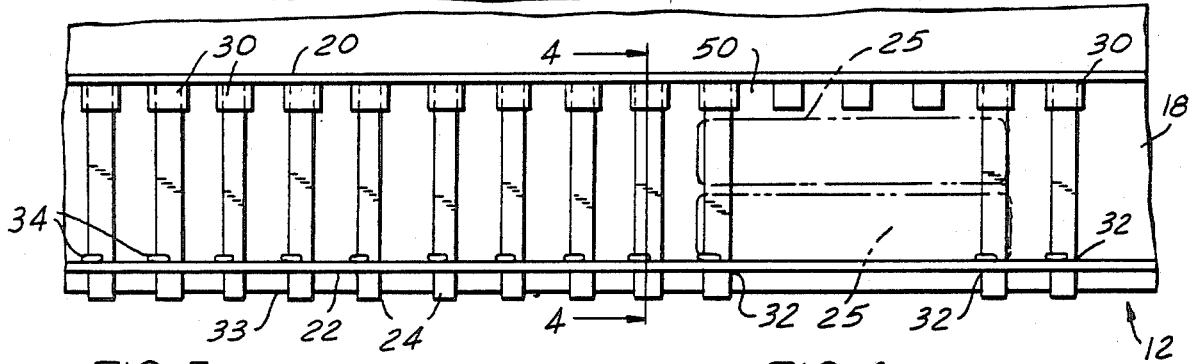
FIG. 5     FIG. 4
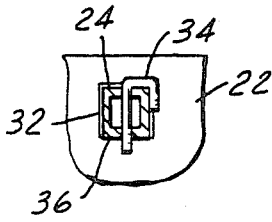
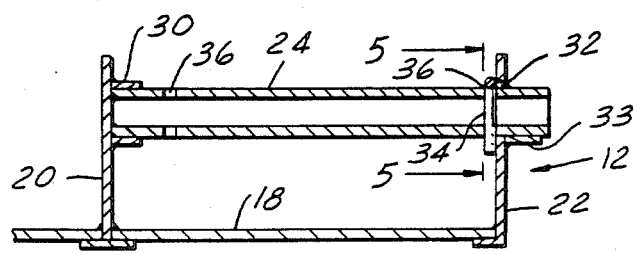

TRAILER WITH SPECIAL RAMPS

This invention relates generally to transports for vehicles, and refers more particularly to trailers having special ramps for loading and unloading the vehicles.

SUMMARY OF THE INVENTION

The trailer of this invention has special ramps over which the wheels of the vehicles travel during loading and unloading. Such ramps are of special design to permit the wheels of the vehicles to drop down into pockets for transit. In that way, more vehicles (stacked and partially overlapped) can be carried and still maintain the overall height below legal limits for clearing bridges, etc.

In accordance with the invention, the transport has a pair of elongated ramps mounted on the transport frame in spaced parallel relation. Each ramp has a plurality of longitudinally spaced transverse pins. The pins are sufficiently close together to provide a track over which the wheels of the vehicles may travel during loading and unloading. The pins are removable so that selected pins may be removed to provide pockets to receive the wheels for transit.

Further in accordance with the invention, each ramp is generally channel-shaped in cross section, having a web and laterally spaced side walls extending upwardly from opposite sides of the web. The transverse pins are disposed above the web and extend across the ramp from one side wall to the other. The pins are removably mounted in openings provided in the side walls. Keys carried by the pins lock the pins in assembled relation. The pins may be removed when the keys are released.

These and other objects of the invention will become more apparent as the description proceeds, especially when considered with the accompanying drawings.

BRIEF DESCRIPTION OF THE DRAWINGS

FIG. 1 is a side elevational view of a transport trailer constructed in accordance with my invention.

FIG. 2 is a semi-diagrammatic side elevational view of a portion of one of the ramps showing certain of the vehicle wheels supported on the traverse pins and other wheels that have dropped down into the pockets provided where the pins have been removed.

FIG. 3 is a plan view of the ramp shown in FIG. 2, together with a showing also of the other ramp for supporting wheels on both sides of the vehicle.

FIG. 4 is a sectional view taken on the line 4—4 in FIG. 3.

FIG. 5 is a sectional view taken on the line 5—5 in FIG. 4.

DETAILED DESCRIPTION

Referring now more particularly to the drawings, there is shown a transport 10 which in the present instance is a highway trailer adapted to carry a load of vehicles V. The transport 10 has a pair of ramps 12 and 14 mounted on the transport frame 16 in laterally spaced, parallel relation. The ramps are identical in construction and therefore only one needs to be described.

Each ramp is generally channel shaped in cross section, having a web 18 and a pair of laterally spaced side walls 20 and 22 extending upwardly from opposite sides of the web. These ramps extend longitudinally of the trailer and while generally horizontal may have upwardly and downwardly inclined sections as is conventional and as shown in the drawings.

Each ramp has a plurality of longitudinally spaced, transverse pins 24 above the web. These pins extend across the ramp from one side wall to the other. The pins are preferably square in cross section and equally spaced from one another but sufficiently close to provide an interrupted track over which the wheels 25 of the vehicles V may travel during loading and unloading. The pins are removably mounted on the side walls so that selected pins may be removed to provide pockets to receive the wheels of the vehicles for transit as will now be described.

Along the inner side of the side wall 20 of each ramp are a plurality of longitudinally equally spaced sockets 30. Sockets 30 are secured to the side wall 20 by any suitable means such, for example, as welding. The sockets open inwardly, that is in a direction toward the other side wall, and are closed at their outer ends. Directly opposite each one of the sockets, the other side wall of the ramp has an opening 32. The sockets and registering openings are of a size sufficient to closely, slidably receive the pins. A flange 33 extends along the outer side of side wall 22 beneath the openings 32 to support the ends of the pins. Flange 33 is secured to side wall 22 by any suitable means such, for example, as welding.

In order to install the pins, they are inserted through the openings 32 in the side wall 22 from the outboard side thereof and extended across the ramp so that their leading ends project into the registering sockets 30 on the opposite side walls. Then in order to prevent the pins from being removed, a key 34 is inserted into a transverse opening 36 in each pin at the inboard side of the side wall 22.

During loading or unloading of the trailer, vehicles V are moved along the ramps with their wheels rolling on the interrupted tracks provided by the pins. Obviously during loading and unloading, all of the pins should be installed at least in those portions of the ramps over which the vehicles must travel. The sockets 30 and flange 33 provide adequate support for the pins which carry the weight of the vehicles. Selected pins are removed from those areas of the ramps where the wheels will be located for transit, to provide pockets 50 in which the wheels are received. The wheels in the pockets 50 rest upon the web 18 of the ramp and are restrained from moving either forwardly or rearwardly by those pins defining the front and rear side of the pockets. As shown in FIG. 1, additional tie downs 52 are provided to securely anchor the vehicles for transit.

One of the reasons for employing the pins is to provide an elevated track so that the vehicles V may move over the variously inclined ramp portions without interference with the vehicle undercarriages. Then after loading, the vehicles, with their wheels in the pockets where selected pins have been removed and resting on the ramp webs 18, can be tied down and maintain a very low profile.

I claim:

1. A transport for hauling wheeled vehicles, said transport comprising a frame, elongated ramps mounted on said frame in spaced, parallel relation for supporting the wheels of said vehicles, each ramp having a plurality of longitudinally spaced transverse pins, said pins being sufficiently close together to provide a track over which the wheels of said vehicles may travel during loading and unloading, said pins being removable so that selected pins may be removed to provide pockets to receive said wheels for transit.

2. A transport for hauling wheeled vehicles, said transport comprising a frame, elongated ramps mounted on said frame in spaced, parallel relation for supporting the wheels of said vehicles, each ramp being generally channel-shaped in cross-section having a web and laterally spaced side walls extending upwardly from the opposite sides of said web, each ramp having a plurality of longitudinally spaced, transverse pins above said web extending across said ramp from one of said side walls to the other, said pins being sufficiently close together to provide a track over which the wheels of said vehicles may travel during loading and unloading, said pins being removably mounted on said side walls so that selected pins may be removed to provide pockets to receive said wheels for transit.

3. A transport as defined in claim 2, wherein said pins are removably mounted by support means engageable with the ends of said pins, and means for releasably locking said pins to said support means.

4. A transport as defined in claim 3, wherein said support means comprise means providing said side walls with openings for receiving the ends of said pins.

5. A transport as defined in claim 4, wherein said pins enter said openings by a longitudinal movement, and said locking means and keys preventing such longitudinal movement.

6. A transport as defined in claim 3, wherein said support means comprise sockets on one of said side walls for receiving one end of said pins and openings in the other side wall for receiving the other ends of said pins, said pins being slidable through said openings and into said sockets, said locking means comprising keys removably attached to said pins and engageable with said other side wall to prevent said pins from being withdrawn from said sockets.

7. A transport as defined in claim 6, wherein said other side wall of each ramp has a flange beneath the openings therein, said flange serving to support said other ends of said pins.

* * * * *

UNITED STATES PATENT AND TRADEMARK OFFICE
CERTIFICATE OF CORRECTION

PATENT NO. : 4,693,651

DATED : September 15, 1987

INVENTOR(S) : Gerald W. Stuart

It is certified that error appears in the above-identified patent and that said Letters Patent are hereby corrected as shown below:

Column 4, line 6 "and" should be --are--

Signed and Sealed this

Nineteenth Day of April, 1988

Attest:

DONALD J. QUIGG

*Attesting Officer*  *Commissioner of Patents and Trademarks*